Figure 1:
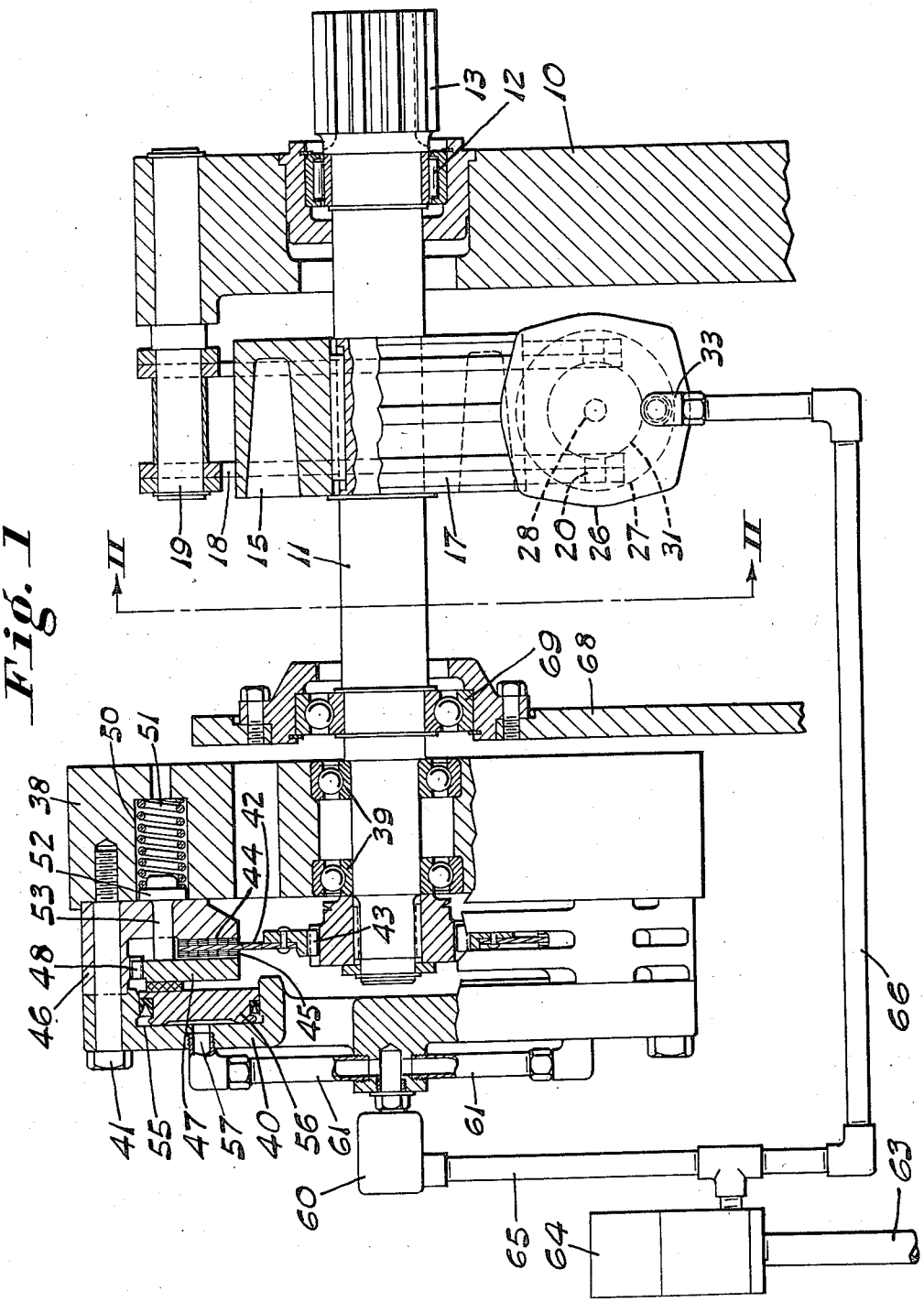

Sept. 22, 1959 F. E. MUNSCHAUER 2,905,290
CLUTCH BRAKE SEQUENCE CONTROL FOR POWER PRESSES AND THE LIKE
Filed May 25, 1954 2 Sheets-Sheet 1

United States Patent Office 2,905,290
Patented Sept. 22, 1959

2,905,290

CLUTCH BRAKE SEQUENCE CONTROL FOR POWER PRESSES AND THE LIKE

Frederick E. Munschauer, Buffalo, N.Y., assignor to Niagara Machine & Tool Works, Buffalo, N.Y.

Application May 25, 1954, Serial No. 432,175

5 Claims. (Cl. 192—12)

This invention relates to drive control means for power presses, power brakes, power shears, and analogous machinery and particularly to the means for transmitting intermittent driving impulses to the work performing parts of the machine from a constantly rotating driving member.

The principles of the present invention are disclosed herein in connection with power-operated sheet metal stamping machines, such as presses, brakes, and shears. However, the principles of the invention are applicable wherever the advantages incident thereto are of benefit. In power punch presses, brakes, and shears, it is of particular importance to provide drive control means which operate to start and stop the ultimate work performing parts of the machine quickly and at correct predetermined positions.

In the power press and shear art generally, it has been found desirable and in most cases essential to provide some kind of brake or drag means or other detaining means to arrest the work performing parts of the machine when the drive is interrupted and hold the work performing parts in their proper idle or rest position. It is common in the punch press and shear art to provide a constantly applied friction brake with the normal running of the work performing parts being accomplished without release of the brake and against the brake friction. Despite the age and high state of development of this art, the problem of providing proper braking or detaining means is of such complexity that the constantly applied brake is the usual mode of design and operation despite the obvious mechanical inefficiency of this expedient.

The present invention provides a novel control arrangement wherein a friction clutch and a friction brake are correlated to operate in a predetermined sequence without any mechanical interconnection or cooperation, whereby there is no necessity for locating the clutch mechanism and the brake mechanism in any particular location relative to each other. The control means of the present invention operates automatically to time the operation of the clutch and brake mechanism so that there can be no overlap in their respective periods of effectiveness, either at the beginning of a cycle of operation or at the end of such cycle.

The problem of avoiding overlap of effectiveness of the clutch and brake in power presses and the like is peculiar to power presses provided with a friction clutch and friction brake arrangement wherein undue friction losses are encountered in overlapping operation, one result being harmful overheating of the clutch and brake elements. One method of avoiding such overlapping comprises mechanically associating the clutch and brake assemblies so that a single operating unit serves both devices, moving from a brake-engaging position to a clutch-engaging position and vice versa.

One disadvantage of this arrangement resides in the fact that the heat generated by both units is localized and may thus be of a degree which adversely affects packings and the like. Furthermore, space limitations often prevent the use of such a unitary arrangement, and if space limitations do not actually prevent its use the space needed for combined clutch and brake assemblies hampers freedom of design to an undesirable degree.

While wholly separate clutch and brake mechanisms are advantageous and solve many space limitations and spread the generated heat in a desirable manner, the correlation of their operation presents other problems. Separate valve controls with electronic time delay devices have been proposed and other complicated sequence arrangements have been contemplated, all of which have been subject to one or more serious practical objections.

With the clutch and brake arrangement of the present invention no extraneous sequence mechanism is required. Speaking generally, the control arrangement of the present invention comprises a brake and a clutch wherein the brake is normally held in engagement by spring means and the clutch is normally held disengaged by spring means. Fluid pressure piston and cylinder operators are provided for each of the clutch and brake to overcome their spring means to render the brake inoperative and the clutch operative and the two piston and cylinder operators are connected to a common pressure supply so that substantially equal pressures prevail at both operators at all times.

The force of the several spring means and the effective fluid pressure areas of the piston and cylinder operating mechanisms are such that the clutch spring means cannot be overcome by fluid pressure operation until after a sufficient fluid pressure has been built up to overcome the brake engaging spring means. That is, the area of the clutch engaging piston is in such proportion to the force of the clutch disengaging spring means and the area of the brake disengaging piston is so proportioned to the force of the brake engaging spring means that clutch engaging cylinder and piston means cannot operate until the unit fluid pressure necessary to effect brake disengagement has been exceeded.

A single embodiment of the principles of the present invention is illustrated in the drawing and described in detail in the following specification, but it is to be understood that such embodiment is by way of example only and that the scope of the present invention is not limited thereto or otherwise than as defined in the appended claims.

Figure 2:
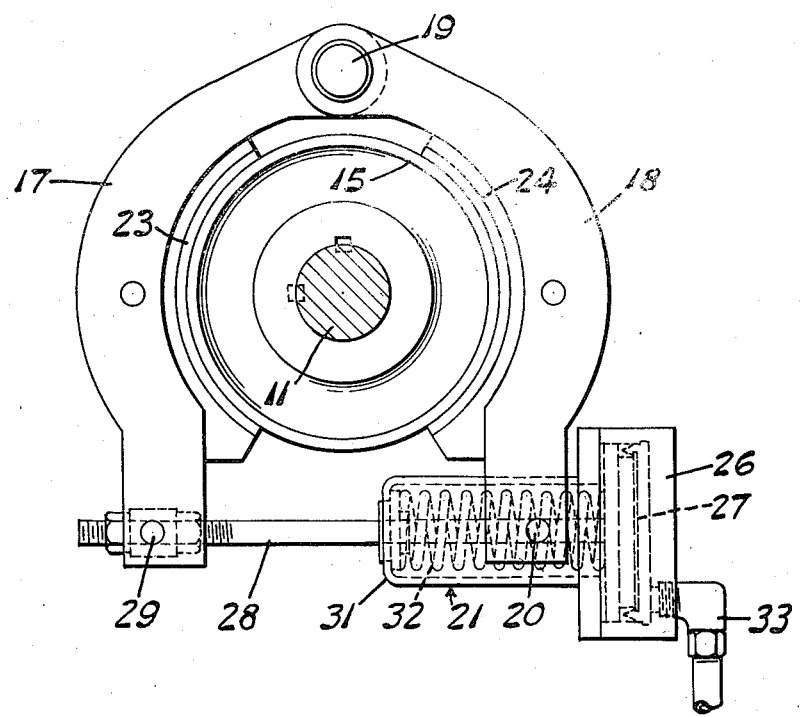

In the drawings:

Fig. 1 is a fragmentary elevational view, partly schematic, showing the upper left-hand portion of a punch press provided with one form of the clutch and brake control means of the present invention; and Fig. 2 is a cross-sectional view taken generally on the line II—II of Fig. 1 and showing the braking mechanism.

Like characters of reference denote like parts in the several figures of the drawing and, referring to Fig. 1, the numeral 10 designates a left-hand side frame member of a punch press and the numeral 11 designates a drive shaft supported therein by means of an anti-friction bearing 12.

As shown in Fig. 1, drive shaft 11 is provided with a driving pinion 13 which meshes with a drive gear (not shown) which may be fixed to an intermediate shaft or directly to the crankshaft of the punch press. In the present instance the clutch and braking mechanisms are associated with the drive shaft 11 in relatively close adjacency but such arrangement is decidedly not essential and a particular feature of the present invention resides in the fact that the clutching and braking mechanisms may be relatively remote and may in fact be disposed on separate shafts in the transmission line between the driving source and the final operating mechanism of the punch press slide. For instance, one of the components might be on the drive shaft, as shown, while the other might be on the intermediate shaft or even on the crankshaft of the punch press.

In the illustrated example the brake mechanism is of the external contracting type and comprises a brake collar or brake drum 15 which is fixed to drive shaft 11. A pair of brake levers 17 and 18 are pivoted to each other as at 19 and brake lever 18 has pivotally attached thereto, as at 20, a brake operating mechanism housing designated generally 21.

The pivotal connection 19 of the brake levers comprises a pivot bolt which is supported in punch press frame member 10 as clearly shown in Fig. 1. Brake levers 17 and 18 are provided with brake shoes 23 and 24, respectively, for frictional braking engagement with brake collar 15.

The brake operating mechanism housing 21 comprises a cylindrical portion 26 containing an operating piston 27, the latter having fixed thereto a piston rod 28 which projects through the outer or lower end of brake lever 17 and is pivoted thereto as at 29 in Fig. 2.

The brake operating mechanism housing 21 includes a reduced cylindrical portion 31 and a compression coil spring 32 is disposed therein and encircles piston rod 28. Spring 32 bears at one end against the outer end of the reduced portion 31 of the brake mechanism housing and at the other end against piston 27, thus normally urging piston 27 to the right as viewed in Fig. 2.

An air connection 33 selectively supplies air pressure to the right-hand end of cylindrical portion 26 of the brake operating mechanism and, when air pressure is thus supplied, urges piston 27 to the left as viewed in Fig. 2 against the resistance of spring 32. When the air pressure connection 33 is inactive or deenergized, spring 32 urges piston 27 and piston rod 28 to the right as viewed in Fig. 2, such movement being relative to the brake mechanism support 21 and relative to the pivotal connection 20 of brake lever 18 thereto. Thus the action of spring 32 is to reduce the distance between pivots 20 and 29 and hold the brake shoes 23 and 24 in a contracted braking position in the absence of countervailing air pressure.

The drive member for drive shaft 11 in the present instance comprises a flywheel 38 having anti-friction bearing mounting on drive shaft 11 as at 39. Flywheel 38 may serve as a drive pulley having belt connection or other rotative connection with a driving motor (not shown). The friction clutch mechanism shown herein by way of example acts between flywheel 38 and drive shaft 11 and includes a generally discoidal support member 40 which is supported against one face of flywheel 38 by means of screws 41 but is generally spaced therefrom in an axially outward direction as viewed in Fig. 1 by a ring member 46.

The friction clutch mechanism includes a driven friction disc 42 which is mounted upon drive shaft 11 for rotation therewith by means of a spline connection 43 but is free to move axially on the spline connection 43. A pair of annular friction members 44 and 45 lie at opposite sides of friction disc 42 for frictional driving engagement therewith. Annular member 44 is supported rigidly against an adjacent face portion of ring member 46 while annular member 45 is fixed against an axially movable clutch pressure plate 47.

Clutch pressure plate 47 has an external spline connection with the interior periphery of ring member 46 as at 48, so that clutch pressure plate 47 may move axially with respect to support 40 and ring member 46 but is held against rotative movement relative to the support 40 and, consequently, relative to flywheel 38.

Flywheel 38 is provided with a circular series of recesses 50 which contain compression coil springs 51. The compression coil springs 51 act against enlarged head portion 52 of a series of plunger or pin members 53 which are supported in right member 46 for axial sliding movement and abut the right-hand face of clutch pressure plate 47, as viewed in Fig. 1, radially outwardly of the friction members 44 and 45. Thus spring members 51 normally urge clutch pressure plate 47 to the left as viewed in Fig. 1 and thus normally maintain the clutch mechanism with the annular members 44 and 45 free of the driven friction disc 42, the clutch being thus normally disengaged.

The clutch support member 40 is provided with an annular recess 55 which receives an annular piston member 56. Piston member 56 is positioned to bear against the left-hand face of clutch pressure plate 47 and support member 40 is provided with one or more air pressure inlet openings 57 which lead to the left-hand side of the annular chamber 55.

Thus upon application of pressure to the inlet passages 57, annular piston 56 is urged to the right as viewed in Fig. 1 against the resistance of coil springs 51, and thus engages the annular members 44 and 45 in clutching engagement against opposite faces of the friction disc 42 of drive shaft 11 to effect engagement of the clutch.

Since the flywheel 38 and support 40 and associated mechanism is normally rotating, the transmission and distribution of air pressure to the passages 57 is effected by means of a rotary union 60 which is mounted axially for free rotation in the outer end of the clutch mechanism, specifically the support 40, and operating air pressure is distributed therefrom to the several passages 57 by means of conduits 61 fixedly carried by the support member 40 of the clutch mechanism.

An air pressure supply conduit 63 is controlled by a solenoid valve 64 and has branch conduits 65 and 66 leading to the fittings 60 and 33, respectively, whereby equal unit air pressure differentials are simultaneously connected to and disconnected from the clutch piston chamber 55 and the brake piston cylinder 26.

In the illustrated instance the shaft 11 is given additional support by means of an auxiliary bracket or secondary wall member 68 rigidly associated with side frame member 10, the shaft 11 having anti-friction bearing therein as at 69.

In the structure described in detail herein by way of example the ratio of the area of the brake piston 27 and the force required to overcome brake spring 32 is greater than the ratio between the area of the clutch cylinder or annular chamber 55 and the force required to overcome clutch springs 51.

It will be seen from the foregoing that the present invention provides a punch press drive and control arrangement including a friction clutch for imparting driving torque to the operating portion of the press and a friction brake for braking the drive portion of the punch press between driving operations. More specifically, the clutch and brake arrangement of the present invention is such that overlap of action as between the friction clutch and the friction brake is not only avoided but effectively prevented.

The friction clutch and brake control arrangement of the present invention is such that overlap of engaging operation of these two components is virtually impossible since pressure failure, or the presence of a pressure differential insufficient to release the brake will be manifestly insufficient to engage the clutch. Furthermore, upon accidental failure of the air pressure during a driving operation the clutch will disengage before the pressure falls to a point where the brake engages.

A system wherein overlap of frictional engaging operation of the clutching and braking components is avoided is of particular importance in drive arrangements which embody a friction clutch and a friction brake, as distinguished from those types of driving organizations wherein a mechanical or jaw clutch is employed, for reasons given in the preamble hereto.

What is claimed is:

1. In a control system for power presses, shears and like machines, a continuously rotating drive element and an intermittently rotatable driven element, friction clutch means acting between said driving and driven elements and having a part movable to effect engagement and disengagement thereof, spring means for holding said part normally disengaged, a fluid pressure piston for moving said part in opposition to said spring means to engage the clutch, a brake acting upon said driven element and spring means urging said brake to braking position, a fluid pressure piston adapted to act in opposition to the brake spring means for releasing the brake, a common fluid pressure source for said two pressure pistons and control means selectively operable to supply substantially equal unit fluid pressures to said two pistons, the ratio between the area of the clutch piston and the disengaging force of the clutch spring means being less than the ratio between the area of the brake piston and the engaging force of the brake spring means.

2. In a control system for power presses, shears and like machines, a continuously rotating drive element and an intermittently rotatable driven element, friction clutch means acting between said driving and driven elements and having a part movable to effect engagement and disengagement thereof, spring means for holding said part normally disengaged, a fluid pressure piston for moving said part in opposition to said spring means to engage the clutch, a brake acting upon said driven element and spring means urging said brake to braking position, a fluid pressure piston adapted to act in oppositon to the brake spring means for releasing the brake, a common fluid pressure source for said two pressure pistons and control means selectively operable to supply substantially equal unit fluid pressures to said two pistons, said two spring means and said two piston areas being so proportioned that the braking force is overcome at a lower unit fluid pressure than the clutch disengaging force.

3. In a control system for power presses, shears and like machines, a continuously rotating drive element and an intermittently rotatable driven element, means for braking said driven element and yieldable means normally acting to render said braking means operative, clutch means engageable between said driving and driven elements and yieldable means normally acting to render said clutch means disengaged, fluid pressure means for releasing said braking means against the resistance of said brake yieldable means for disengaging the braking means and fluid pressure means for engaging said clutch means against the resistance of said clutch yieldable means, a common fluid pressure source for supplying substantially equal unit fluid pressures to said two fluid pressure means, and selectively operable control means for simultaneously connecting said fluid pressure source with said two fluid pressure means, said two fluid pressure means and said two yieldable means being so proportioned that said braking means is disengaged at a lower unit fluid pressure than the unit pressure at which said clutch means is disengaged.

4. In a control system for power presses, shears and like machines, a continuously rotating drive element and an intermittently rotatable driven element, means for braking said driven element and yieldable means normally acting to render said braking means operative, clutch means engageable between said driving and driven elements and yieldable means normally acting to render said clutch means disengaged, fluid pressure means for releasing said braking means against the resistance of said brake yieldable means for disengaging the braking means and fluid pressure means for engaging said clutch yieldable means, a common fluid pressure source for supplying substantially equal unit fluid pressures to said two fluid pressure means, and selectively operable control means for simultaneously connecting said fluid pressure source with said two fluid pressure means, the ratio of the effective area of the clutch fluid pressure means to the clutch yieldable means releasing force being less than the ratio of the effective area of the brake fluid pressure means to the brake yieldable means engaging force.

5. In a control system for power presses, shears and like machines, and an intermittently rotatable shaft element and a continuously rotating drive element mounted for free rotation thereon, means for braking said shaft element and yieldable means normally acting to render said braking means operative, clutch means engageable between said drive element and said shaft element and yieldable means normally acting to render said clutch means disengaged, fluid pressure means for releasing said braking means against the resistance of said brake yieldable means for disengaging the braking means and fluid pressure means for engaging said clutch means against the resistance of said clutch yieldable means, a common fluid pressure source for supplying substantially equal unit fluid pressures to said two fluid pressure means, and selectively operable control means for simultaneously connecting said fluid pressure source with said two fluid pressure means, the ratio of the effective area of the clutch fluid pressure means to the clutch yieldable means releasing force being less than the ratio of the effective area of the brake fluid pressure means to the brake yieldable means engaging force.

References Cited in the file of this patent

UNITED STATES PATENTS

| | | |
|---|---|---|
| 1,298,956 | Johnson | Apr. 1, 1919 |
| 1,869,085 | Williamson | July 26, 1932 |
| 1,960,705 | Kochling | May 29, 1934 |
| 2,581,637 | Danly et al. | Jan. 8, 1952 |
| 2,656,028 | Johansen | Oct. 20, 1953 |
| 2,706,026 | Georgeff | Apr. 12, 1955 |
| 2,759,582 | Dehn | Aug. 21, 1956 |

FOREIGN PATENTS

| | | |
|---|---|---|
| 696,786 | Great Britain | Sept. 9, 1953 |